(12) United States Patent
Righetti et al.

(10) Patent No.: US 7,699,379 B2
(45) Date of Patent: Apr. 20, 2010

(54) LOCKING DEVICE FOR A VEHICLE PART

(75) Inventors: Claudio Ivano Righetti, Turin (IT); Stefan Hegner, Ried (DE); Ferdinand Hahn, Diessen (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/813,556

(22) PCT Filed: Dec. 16, 2005

(86) PCT No.: PCT/DE2005/002283

§ 371 (c)(1),
(2), (4) Date: Mar. 4, 2008

(87) PCT Pub. No.: WO2006/072226

PCT Pub. Date: Jul. 13, 2006

(65) Prior Publication Data

US 2008/0277974 A1    Nov. 13, 2008

(30) Foreign Application Priority Data

Jan. 8, 2005    (DE) .................... 10 2005 001 079

(51) Int. Cl.
    *B60J 7/185* (2006.01)
(52) U.S. Cl. ........................ 296/128; 296/224
(58) Field of Classification Search ............. 296/124, 296/128, 224
    See application file for complete search history.

(56) References Cited

U.S. PATENT DOCUMENTS 4,664,436 A * 5/1987 Eyb ........................ 296/121
4,830,426 A * 5/1989 Schlachter et al. ........ 296/121
5,765,884 A    6/1998 Armbruster

FOREIGN PATENT DOCUMENTS

DE    200 22 241 U1    8/2001
EP    0 942 123 A1     9/1999
EP    1 321 607 A2     6/2003
EP    1 455 040 A2     9/2004

OTHER PUBLICATIONS

International Search Report for International Applicaiton No. PCT/DE2005/002283.

\* cited by examiner

*Primary Examiner*—Dennis H Pedder
(74) *Attorney, Agent, or Firm*—David S. Safran; Roberts Mlotkowski Safran & Cole, P.C.

(57) ABSTRACT

A locking device for a movable motor vehicle part (2), especially a movable roof part of a vehicle roof which can be opened, has a locking element (3) for fixing the vehicle part (2) in the end position of motion, a pivoting support (5) which can be pivoted between a rest position and an operating position. The locking element (3) is movably supported on the pivoting support (5), and is covered on the visible side by the pivoting support (5) when it is in a rest position. When the vehicle part (2) has moved into the end position of its motion, it is supported by the pivoting support which has pivoted into the operating position (5), and in this position, is fixed by the locking element. The locking element is covered on the visible side by the pivoting support when it is in the rest position.

11 Claims, 6 Drawing Sheets

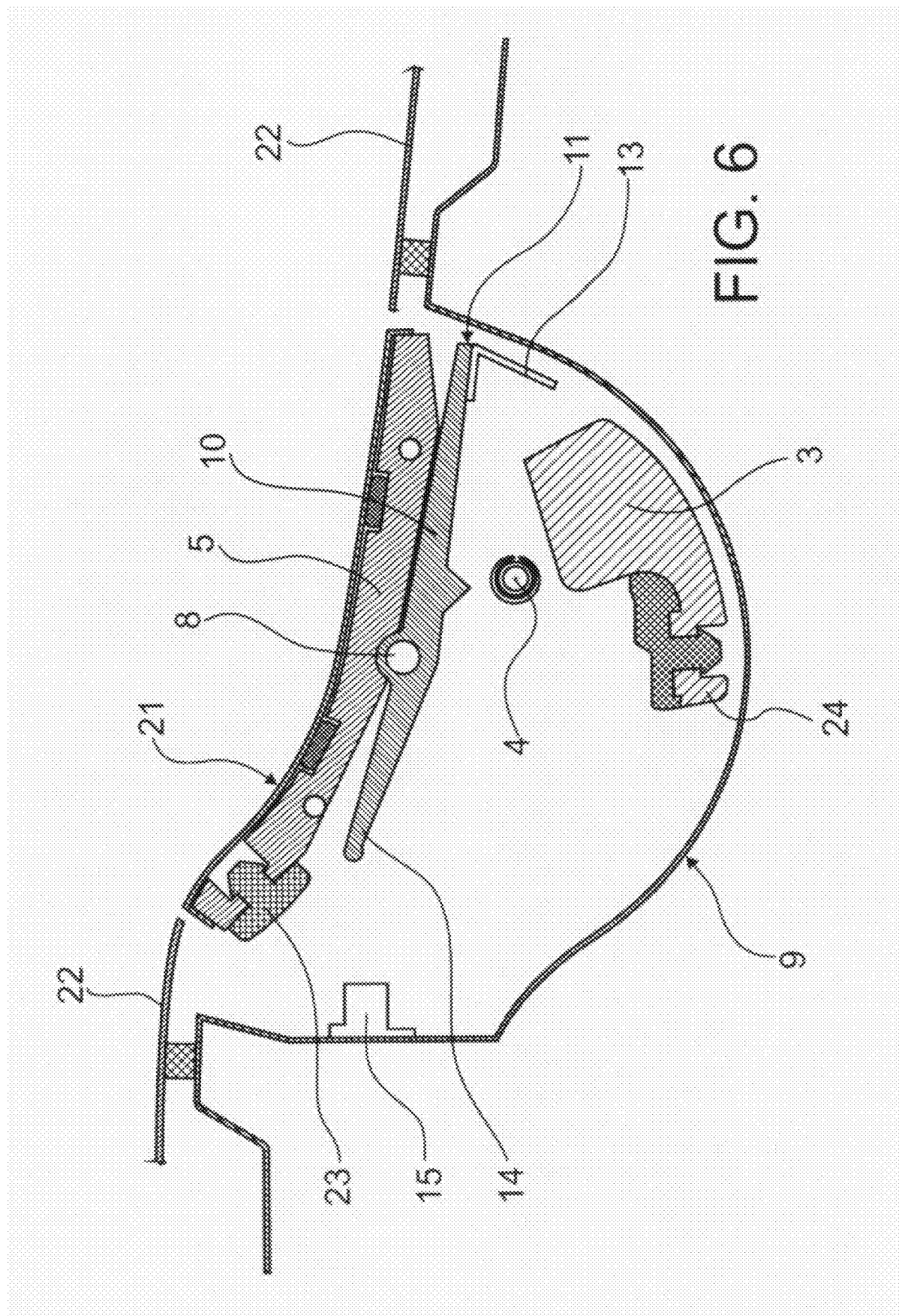

LOCKING DEVICE FOR A VEHICLE PART

BACKGROUND OF THE INVENTION

1. Field of the Invention

The invention relates to a locking device of a movable motor vehicle part, especially a movable roof part of a vehicle roof which can be opened, with a locking element for fixing the vehicle part in the end position of motion, and a process for locking this vehicle part.

2. Description of Related Art

A locking device of the initially mentioned type is known, for example, on a folding convertible top of a convertible for locking the opened convertible top in its stowed position in a stowage space (see, for example, BMW Mini Cabrio). The locking device, which also locks the closed convertible top on the apron, is covered by convertible top components, and thus, is not visible either with the convertible top closed and also with the convertible top opened. On the other hand, for example, locking devices of sliding vehicle doors are open in sight; this can be undesirable for aesthetic reasons.

SUMMARY OF THE INVENTION

The object of the invention is to devise a locking device of the initially mentioned type which can be integrated, especially advantageously, into the vehicle surroundings by its structure and which is improved with respect to its serviceability, and to devise a corresponding process.

This object is achieved by a locking device with a pivoting support which can be pivoted between a rest position and an operating position and a locking element that is movably supported on the pivoting support. Because there is a pivoting support which can be pivoted between a rest position and an operating position and because the locking element is movably supported on the pivoting support, is covered on the visible side by the pivoting support which is in the rest position, and which pivots into an approach position from which it can be moved into its lock position in order to fix the vehicle part which has moved into its end position of motion, the locking device can be integrated in an optically inconspicuous manner on the vehicle so that it emerges from the surrounding body surface, only if necessary, with at least one component. The design of the vehicle can thus be made independently of the locking mechanism.

Preferably, there is a sensor lever which, in the operating position of the pivoting support, is in the action position and is moved from the vehicle part, which has been moved into the end position of its motion, into a signal position on the approach sensor. The position of the vehicle part on the locking device can be detected by means of the sensor lever which can, generally, be any transmission element without its having to be in direct contact or in the immediate vicinity of the approach sensor. Thus, the approach sensor can be located in an especially hidden position which is not visible and which is favorable with respect to installation space.

Advantageously, the approach sensor is a Hall sensor which is designed to detect a metallic part of the sensor lever. Thus, the vehicle part which is to be locked can be made at least partially of any material, such as glass or plastic, since the vehicle part is not detected directly by the Hall sensor.

In a preferred configuration, the sensor lever with the pivoting support can be pivoted between a rest position and the operating position and it has an actuation end which is actuated in the operating position by the approached vehicle part and an opposite sensor end with a sensor part which can be detected by the approach sensor. The sensor lever is supported especially coaxially to the pivoting axis of the pivoting support and can be moved between two stops on the pivoting support.

According to another preferred configuration, there are a locking sensor which is assigned to the locking element and which detects at least one position of the locking element, and a drive means which moves the locking element based on a signal of the approach sensor and of the locking sensor into its lock position. Preferably, the locking sensor is also a Hall sensor which can detect the at least partially metallic locking element. The locking element is especially a pivoting lock hook which on its free lock end has a coating or cap part for carefully gripping the vehicle part which can be the roof part of a hardtop roof which consists completely or at least partially of plastic or glass.

For simple and reliable operation, it is advantageous if, by means of the two sensors, a control means of the locking device can be normalized by a reference being produced between the position of the locking element and the position which is stored in the control means by means of a normalization run which is carried out automatically or without such a visible normalization run. Thus, normalization or renormalization can either be omitted or this is performed by means of the control without the assistance of the user.

Optical and functional integration of the locking device is easily possible when it is accommodated in a bearing housing which is located under a recess in the body skin so that the pivoting support in its rest position in the recess is flush with the body skin and when pivoted into the operating position the locking element is pivoted out of its covered position through the recess above the level of the body skin.

The object is also achieved by a process wherein the vehicle part which has been moved into a locking position on the locking device is indirectly detected by means of a transmission part from a sensor, and wherein, based on the signals of two sensors, the locking element is moved out of a waiting position into its lock position which fixes the vehicle part. Because a locking element of the locking device is moved out of a hidden rest position into a waiting position in which it is immediately detected by a first sensor, because the vehicle part which has been moved into its locking position on the locking device is indirectly detected by means of a transmission part from the second sensor, and because based on the signals of the two sensors the locking element is moved out of its waiting position into its lock position which fixes the vehicle part, reliable locking is easily effected by means of a locking device which is optically inconspicuous when not in use.

It is preferably provided that the locking element is supported on the pivoting support of the locking device which in the rest position covers the locking device, which is pivoted into the operating position and which in doing so moves the locking element out of the covered rest position into a waiting or approach position.

When the transmission part is formed by a sensor lever which is supported on the pivoting support and is moved from the pivoting support as it pivots into the approach position in which the assigned second sensor does not yet detect the sensor lever, otherwise direct contact between the vehicle part and the second sensor is not necessary. Especially when a Hall sensor is used and the sensor lever has a metallic part which is assigned to the Hall sensor can the vehicle part which actuates the sensor lever be made from any material. While a signal is not produced in this position by the second sensor, to control the locking device it can feasibly be provided that the vehicle part which assumes the end position of its motion on the locking device actuates the sensor lever and moves it out of its approach position into its lock position in which the second sensor detects the sensor lever and thus produces a control signal.

A locking device in accordance with the invention is explained in detail below with reference to the accompanying drawings.

BRIEF DESCRIPTION OF THE DRAWINGS

FIG. 6 is a lengthwise sectional view perpendicular to the pivoting axis of the pivoting support the components of the locking device in the position as shown in FIG. 1.

DETAILED DESCRIPTION OF THE INVENTION

Figure 1:
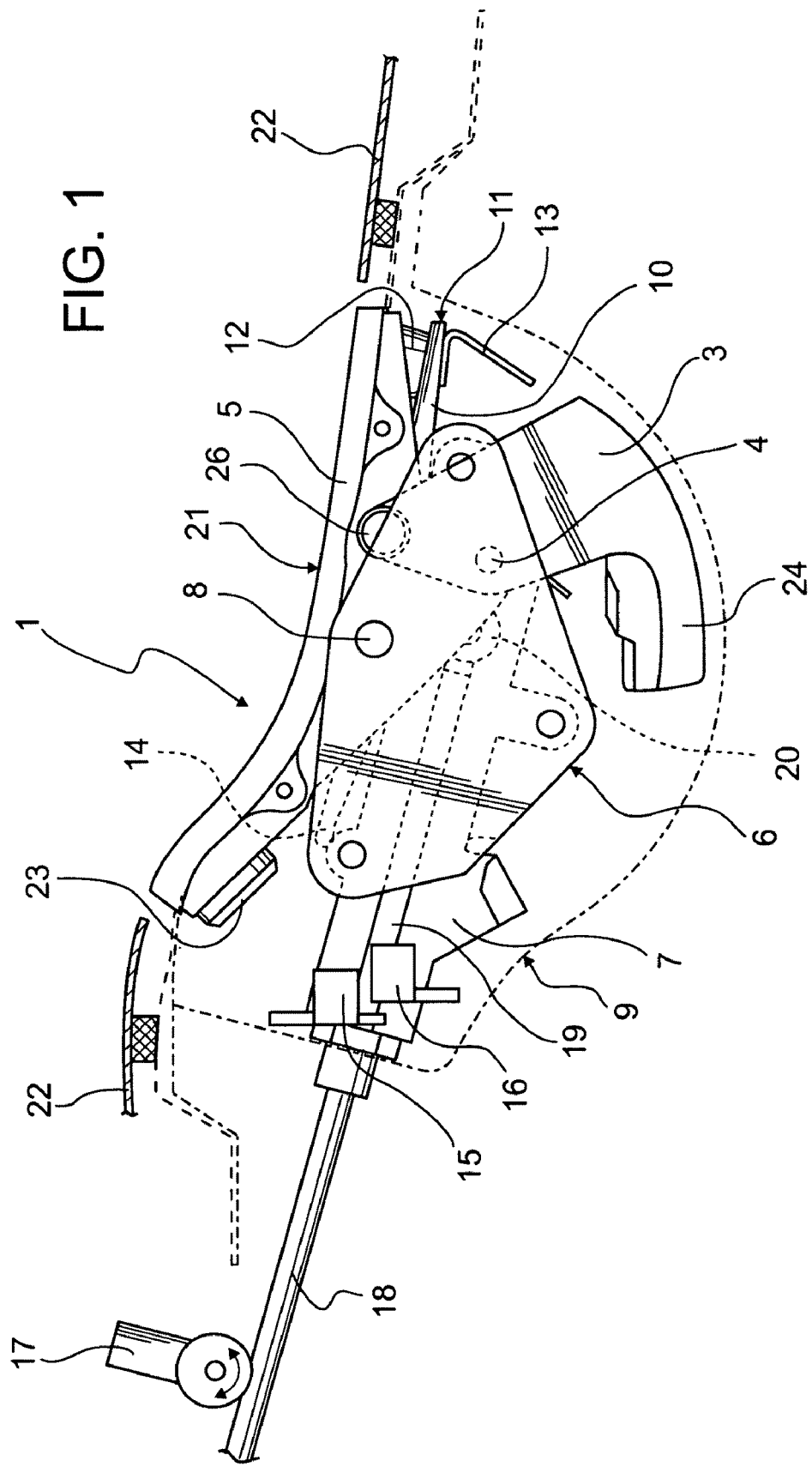
FIG. 1 is a side view of a locking device of a vehicle which has a pivoting support and a locking element in the rest position.

The locking device 1 for a movable part of a vehicle, for example, the glass roof part 2 (FIG. 4) of a convertible, contains a locking element in the form of a lock hook 3 which is pivotally supported on a pivoting support 5 by means of a pivot bearing pin 4. The pivoting support 5 is supported between a bearing plate 6 and a driving support 7 to be able to pivot around a pivot bearing pin 8 which is supported thereon and which is located parallel to the pivot bearing pin 4 of the lock hook 3 and spaced apart from it. The bearing plate 6 and the driving support 7 are attached stationary in the bearing housing 9 which is in turn fastened to the vehicle.

A sensor lever 10 is supported between its two ends in its lengthwise direction on the pivoting support 5, especially likewise, to be able to pivot around the pivot bearing pin 8, and can be pivoted jointly with the pivoting support 5. The first end of the sensor lever 10, which is called the sensor end 11, and which in the rest position of the locking device 1 (see, FIG. 1) adjoins a stop 12 on the bottom of the pivoting support 5 (bottom with respect to the rest position as shown in FIG. 1), contains a metallic sensor part 13 which projects from the sensor lever 10 in the direction which is opposite the pivoting support 5. The second end of the sensor lever 10, which is called the actuating end 14, is likewise located under the pivoting support 5.

On the bearing housing 4, there are two sensors 15, 16, especially Hall sensors. The first sensor 15, which is also called a locking sensor, is designed for detection of the position of the lock hook 3, while the second sensor 16, which is also called an approach sensor, is used to detect the position of the sensor lever 10 via its sensor part 13.

A driving means has a drive cable 18 which can be actuated by a drive motor 17, for example, a tension-compression cable (shown only in FIG. 1) which is held on the driving support 7 in a cable guide 19, can be moved lengthwise in it and is connected to a coupling unit 20 which is intended for moving the pivoting support 5 and the lock hook 3.

In the rest position of the locking device (see FIG. 1), the pivoting support 5 is located with its top or outside 21 facing up. The shape of the top of the pivoting support 5 is matched to the adjacent body skin 22 and the pivoting support 5 is located in a recess of the body skin 22 flush with it. The locking hook 3 is located in a downwardly pointed pivoting position in the bearing housing 9 which extends down, for example, in a semicircle.

Figure 2:
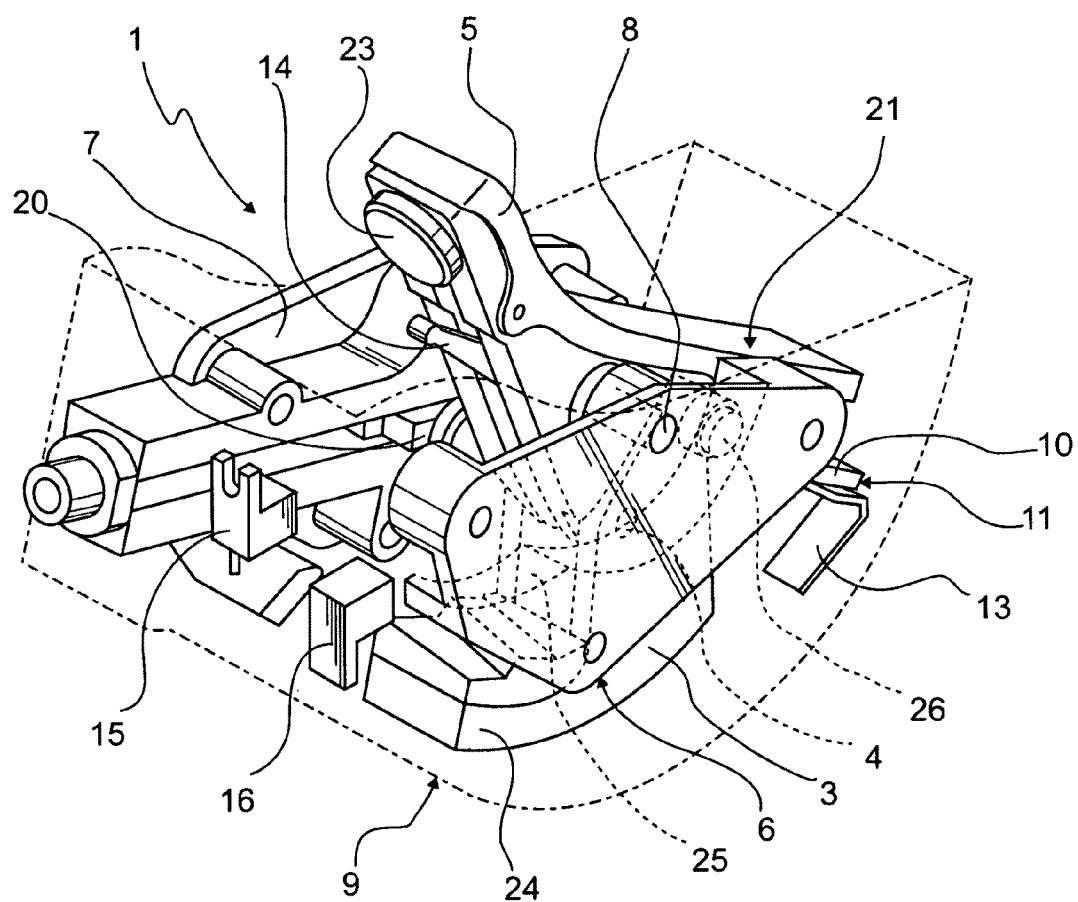
FIG. 2 is a a perspective top view of the locking device in the first intermediate position when the pivoting support is being pivoted.
Figure 3:
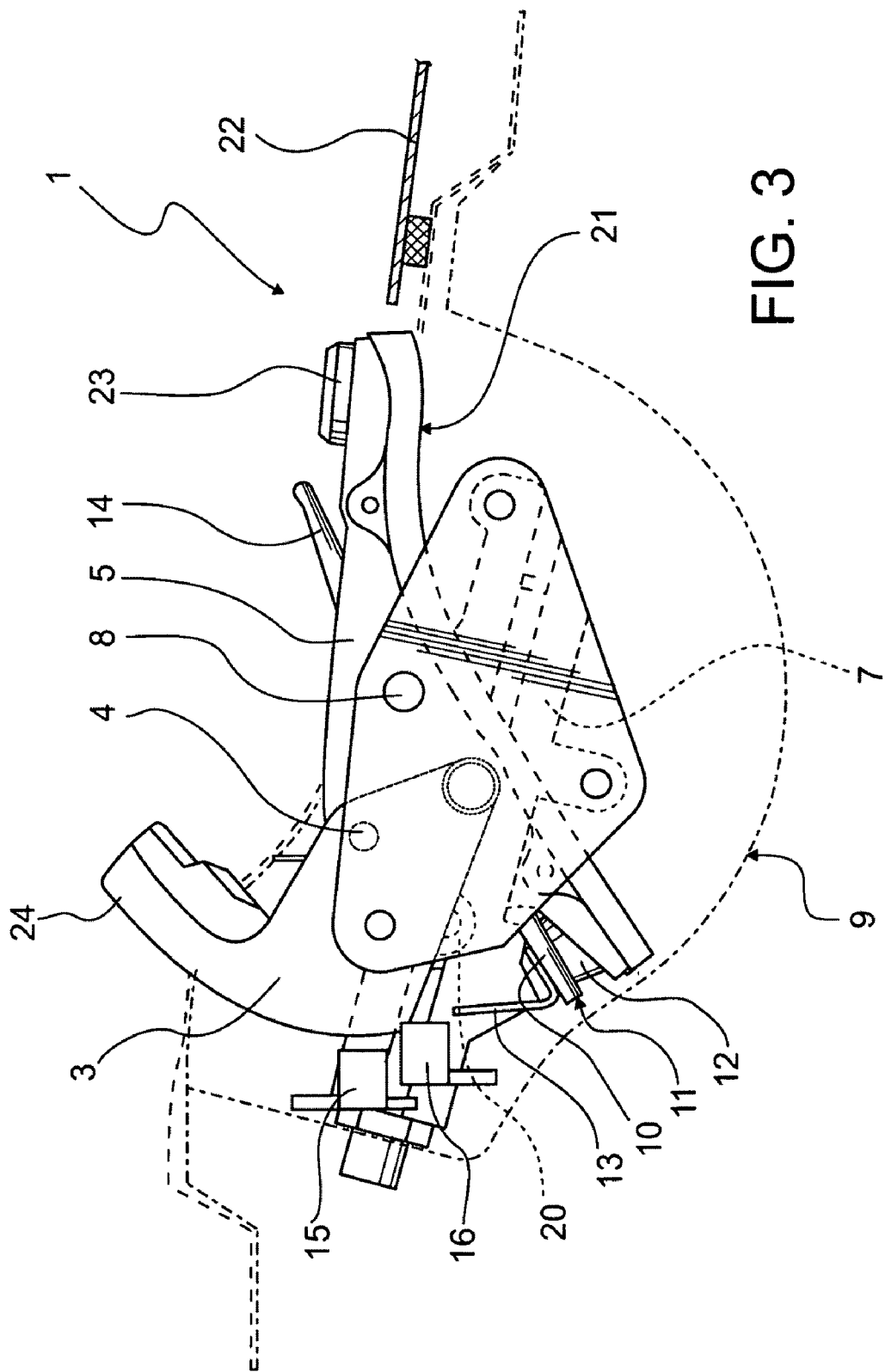
FIG. 3 is a side view of the locking device, the locking element being moved into the approach position with the pivoting support having been pivoted.

When the movable part of the vehicle or the glass roof part 2 of the convertible is to be moved into its open or stowed position and locked in it, beforehand, by actuating the drive motor 17, the pivoting support 5 is pivoted by almost 180° through the intermediate position shown in FIG. 2 into the readiness position shown in FIG. 3 in which a support element 23 which, on the end of the pivoting support 5, opposite the stop 12, is located on its bottom, is located pointing up in the position above the adjacent body skin 22. When the pivoting support 5 is pivoted, the lock hook 3 is entrained and pivots out with its hook end 24 relative to the body skin 22 (movement clockwise according to FIGS. 1 to 3).

In the readiness position, the sensor lever 10 is arranged such that its metallic sensor part 13 is still outside the detection region of the second sensor 16. The metallic lock hook 3 is, conversely, located in the detection region of the first sensor 15. The actuating end 14 of the sensor lever 10 projects up beyond the level of the support element 23.

Figure 4:
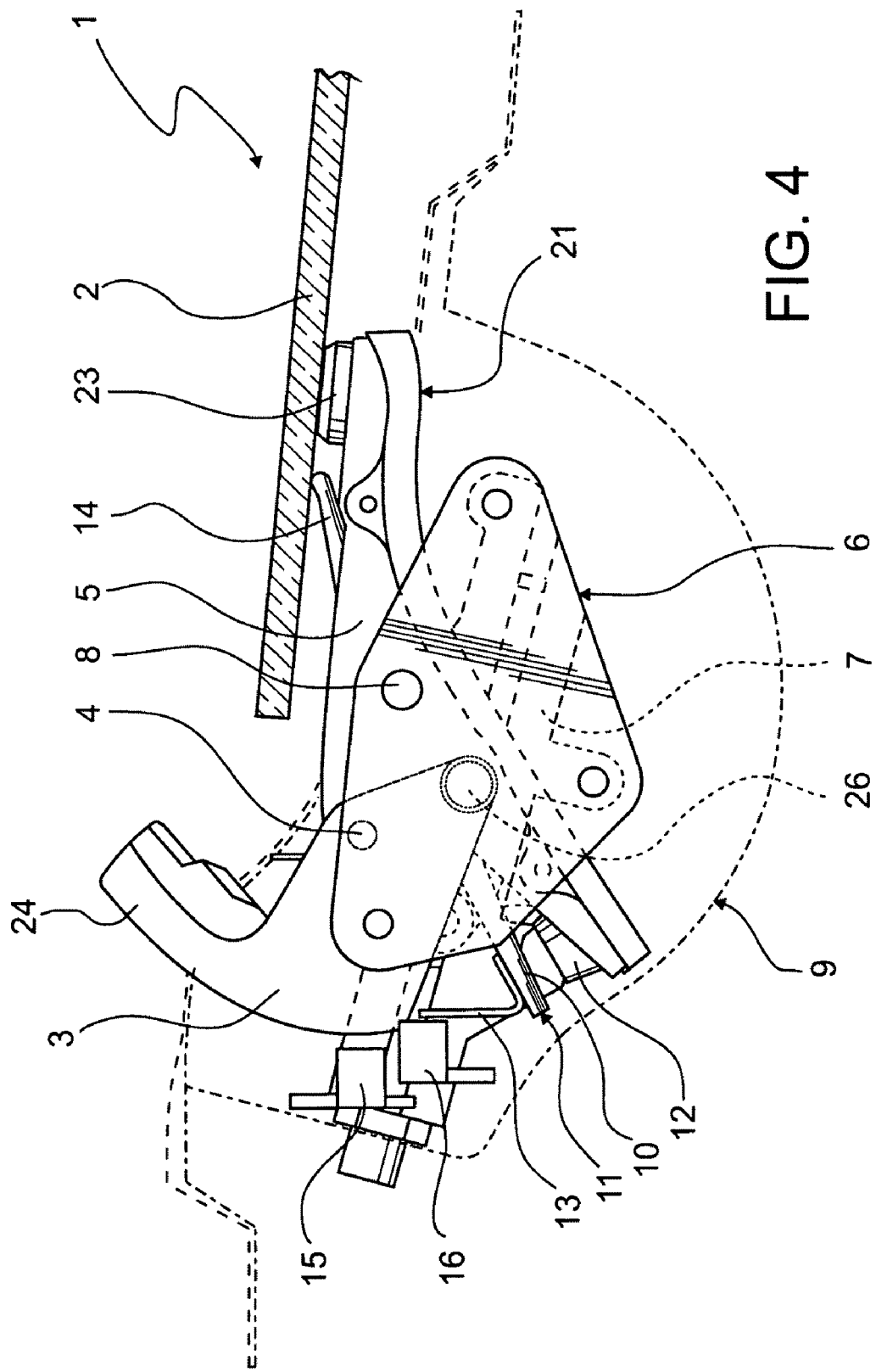
FIG. 4 shows the locking device in a side view, the vehicle part to be locked having actuated a sensor lever.

FIG. 4 shows the position of the locking device after the glass roof part 2 has been moved into the open or stowed position. The glass roof part 2, at this point, rests on the support element 23 of the pivoting support 5 and has pivoted the sensor lever 10, via its actuating end 14, relative to the pivoting support 5. In doing so, the sensor end 11 reaches a position in which its sensor part 13 is located in the detection region of the second sensor 16. With the signal produced by the second sensor 16, a pivoting drive means of the convertible roof or glass roof part 2 can be controlled such that the stowage motion of the glass roof part 2 is ended at this point.

Figure 5:
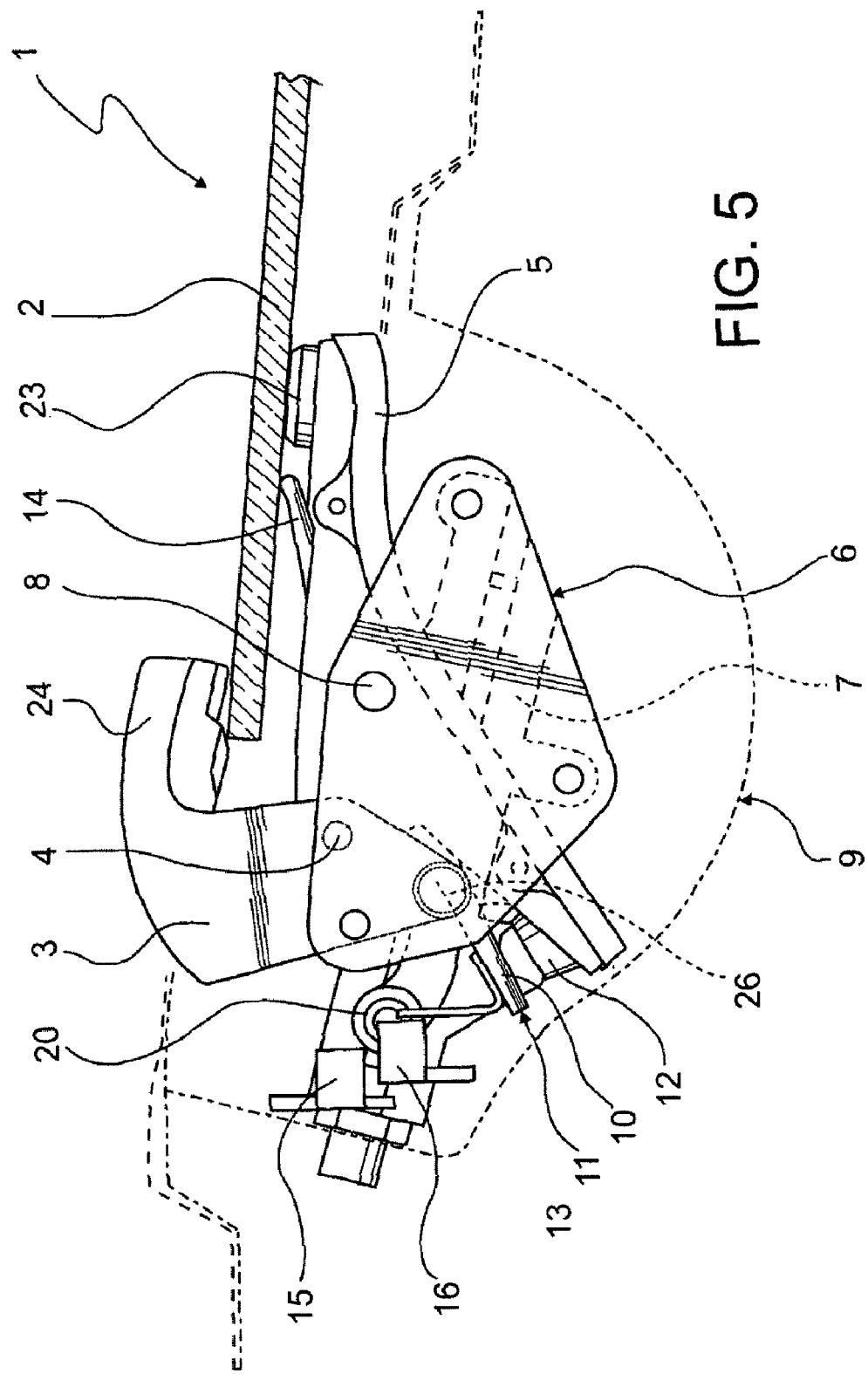
FIG. 5 is a side view of the locking device, the locking element being pivoted into its lock position which holds the vehicle part.

A control means of the locking device is designed such that, in the presence of the signals of the first sensor 15 and of the second sensor 16, the drive motor 17 of the locking device continues to pivot the lock hook 3 relative to the pivoting support 5 into its lock position (see, FIG. 5) in which its hook end 24 extends around the edge of the glass roof part 2 and keeps it locked.

Turning off of the drive motor 17 can be controlled, for example, by the remaining signal of the first sensor 15 when the lock hook 3 leaves the detection region of the first sensor 15 as it pivots into its lock position and/or via measuring the rpm gradient of the drive motor 17 when the lock hook 3 engages the glass roof part 2 and its pivoting motion which has been stopped thereby produces a reaction on the drive motor 17. The detection of the rpm gradient can also be used as pinch protection, and the motor-driven pivoting motion of the lock hook 3, if necessary, can be stopped by the control means.

For unlocking, the drive motor 17 is actuated by the control means in the opposite drive direction so that the locking hook 3 is pivoted into its waiting position, and then, with the pivoting support 5 back into its lowered rest position.

To control the motion of the locking hook 3, for example, there can be a guide link 25 for the guide pin 26 which projects laterally from the lock hook 3.

The locking device is attached, for example, centrally in the rear area of a convertible, or two of these locking devices are spaced apart from one another in order to lock the glass roof part 2 on its transverse edge or on the opposing side edges. In general, also other vehicle parts, such as hatches, covers or doors, can be locked with this locking device.

What is claimed is:

1. Locking device of a movable motor vehicle part of a vehicle roof which can be opened, comprising a locking element for fixing the vehicle part in an end position of motion, and a pivoting support that is pivotable between a rest position and an operating position, wherein the locking element is movably supported on the pivoting support, is covered on a visible side by the pivoting support in the rest position, and is movable, from the pivoting support which pivots into the operating position, into an approach position from which the locking element is movable into its lock position to fix the vehicle part which has moved into an end position of its motion.

2. Locking device as claimed in claim 1, further comprising an approach sensor and a sensor lever, wherein the sensor lever is in an action position when the pivoting support is in the operating position and is moved to a signal position on the approach sensor when the vehicle part moves into its end position of motion.

3. Locking device as claimed in claim 2, further comprising a locking sensor which is assigned to the locking element and which detects at least one position of the locking element, and which a drive means for moving the locking element into its lock position based on a signal of the approach sensor and of the locking sensor.

4. Locking device as claimed in claim 2, wherein the sensor lever is pivotable with the pivoting support between the rest position and the operating position and wherein the sensor lever has an actuation end which is actuated in the operating position by approach of the vehicle part and an opposite sensor end with a sensor part which is detectable by the approach sensor.

5. Locking device as claimed in claim 3, wherein the sensors are Hall sensors.

6. Locking device as claimed in claim 3, further comprising a control means for controlling operation of the locking device, wherein the control means is normalizable in a normalization run by a reference signal produced by means of the sensors between the position of the locking element and a reference position which is stored in the control means.

7. Locking device as claimed in claim 1, wherein the locking device is configured to be accommodated in a bearing housing located under a recess in the body skin so that the pivoting support is in the recess flush with the body skin in its rest position and the locking element is pivoted out of a covered position through the recess to above the level of the body skin when pivoted into the operating position.

8. Process for locking a movable motor vehicle part of a vehicle roof which can be opened, by means of a locking device having a locking element, comprising the steps of:

moving the locking element of the locking device out of a hidden rest position into a waiting position in which it is immediately detected by a first sensor, using a second sensor to indirectly detect movement of the vehicle part into a locking position on the locking device by means of a transmission part, and based on the signals of the two sensors, moving the locking element out of its waiting position into a lock position which fixes the position of the vehicle part.

9. Process as claimed in claim 8, wherein the locking element is supported on a pivoting support of the locking device, which support covers the locking device in the rest position and is pivoted into an operating position, and in doing so, moves the locking element out of the covered rest position into the waiting or an approach position.

10. Process as claimed in claim 9, wherein the transmission part is formed by a sensor lever which is supported on the pivoting support and is moved from the pivoting support as it pivots into a lever approach position in which the second sensor does not yet detect the sensor lever.

11. Process as claimed in claim 10, wherein the vehicle part actuates the sensor lever and moves it out of the lever approach position into its lock position in which the second sensor detects the sensor lever when the vehicle part assumes an end position of its motion on the locking device.

* * * * *